March 18, 1952  J. F. STALTER  2,589,514
PLASTIC THREAD
Filed March 23, 1949  2 SHEETS—SHEET 1
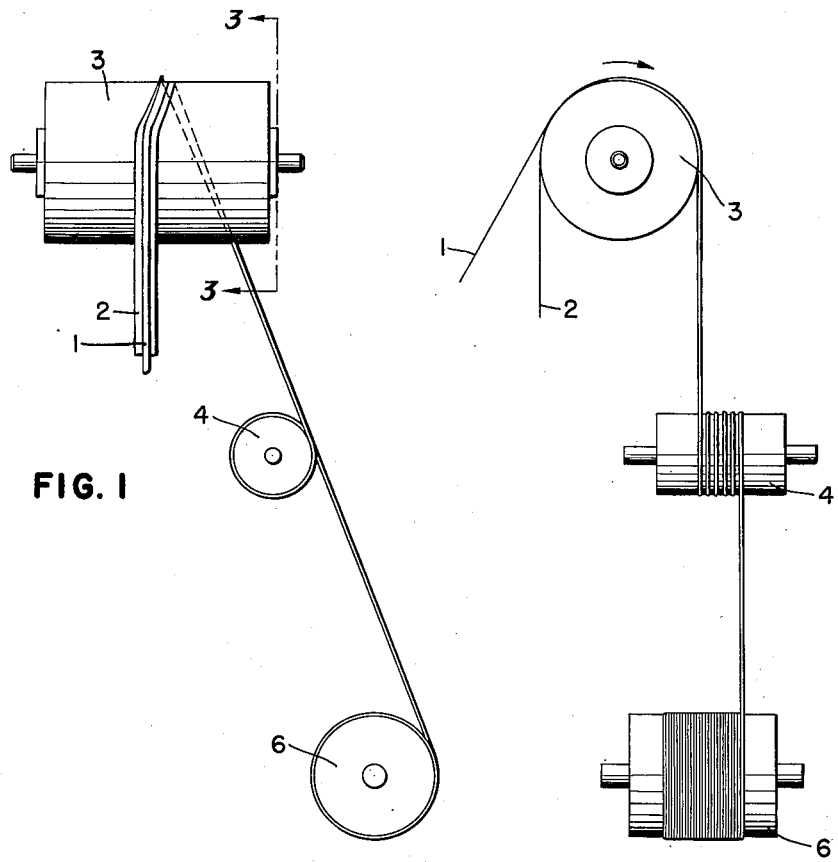
FIG. 1
FIG. 2
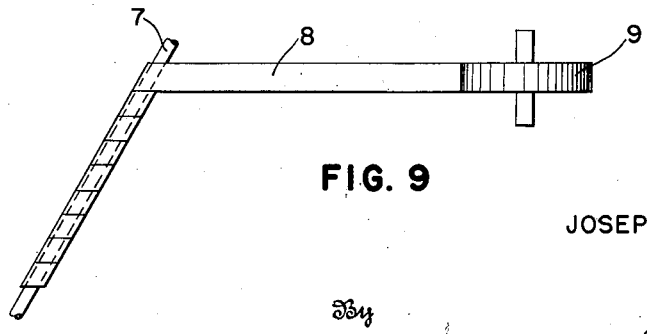
FIG. 9
Inventor
JOSEPH F. STALTER
By
R. B. Waters
ATTORNEY March 18, 1952 J. F. STALTER 2,589,514
PLASTIC THREAD
Filed March 23, 1949 2 SHEETS—SHEET 2
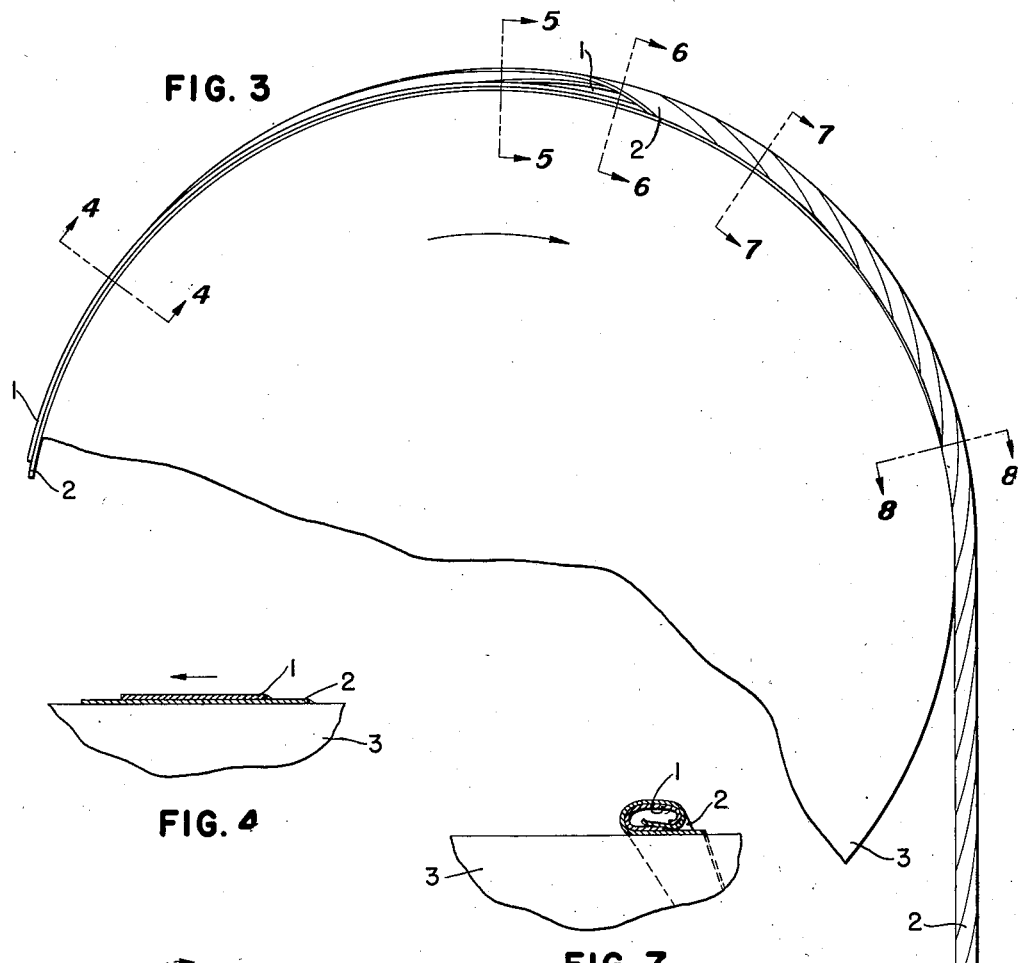
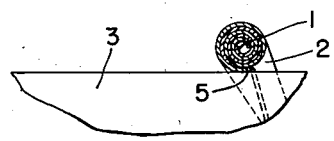
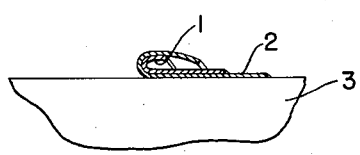
Inventor
JOSEPH F. STALTER
By
R. H. Waters
ATTORNEY

UNITED STATES PATENT OFFICE 2,589,514

PLASTIC THREAD

Joseph F. Stalter, Akron, Ohio, assignor to Wingfoot Corporation, Akron, Ohio, a corporation of Delaware Application March 23, 1949, Serial No. 83,040

9 Claims. (Cl. 57—140)

This invention relates to a plastic thread. More specifically, the invention relates to a thread having an inner portion of rubber hydrochloride enclosed in a sheath of vinyl chloride resin.

Threads of rubber hydrochloride are well known and widely used in the plastic industry. Although these have good strength and dimensional stability, they are not entirely satisfactory due to the poor aging properties of the rubber hydrochloride. Vinyl chloride resins have also been fabricated into threads, but these have poor dimensional stability, especially at temperatures above 100° F. which cause serious shrinkage. Temperatures above 100° F. are frequently encountered under normal atmospheric conditions.

The purpose of this invention is to provide a plastic thread having improved tensile strength and aging properties. A further purpose of this invention is to provide a method of preparing a plastic thread having an inner portion of rubber hydrochloride enclosed in a vinyl chloride sheath in such manner that the composite thread has properties not to be found in threads made of the individual components alone. A further purpose is to provide a means for assembling the rubber hydrochloride component and the vinyl chloride resin component into a strong thread structure since the two materials cannot be bonded together by heating.

In accordance with this invention, a ribbon of rubber hydrochloride is superimposed on a ribbon of a vinyl chloride resin of slightly larger width and the two ribbons are passed over a heated roll and rolled into a thread structure and stretched. Instead of employing a ribbon of rubber hydrochloride a preformed thread of rubber hydrochloride may be employed and ribbon of vinyl chloride resin may be wound into a sheath thereon.

The invention is described more fully by reference to the accompanying drawings, in which Fig. 1 is a front elevation, in diagrammatic form of a preferred form of apparatus employed in carrying out the invention; Fig. 2 is a side elevation of the apparatus shown in Fig. 1; Fig. 3 is an enlarged view taken on the line 3—3 of Fig. 1; Figs. 4, 5, 6, 7 and 8 are views taken on the lines 4—4, 5—5, 6—6, 7—7 and 8—8 respectively of Fig. 3. Fig. 9 is a diagrammatic showing of an alternative form of apparatus for carrying out the invention.

Referring to Figs. 1 and 2, a continuous ribbon of rubber hydrochloride 1 is contacted with a continuous ribbon 2 of vinyl chloride resin and the two ribbons are simultaneously and obliquely drawn over a heated rotatable cylinder 3. The ribbon of vinyl chloride resin 2 is placed in contact with the surface of the cylinder 3 with the ribbon of rubber hydrochloride 1 centered thereon and out of direct contact with the cylinder 3. The ribbon 2 is preferably slightly wider than the ribbon 1, i. e., about 1/8" to 1/4" wider. Upon contact with the heated cylinder 3, the vinyl chloride resin ribbon 2 is heated to a heat-sealing temperature tending to adhere to the surface of the cylinder and travel in the direction of rotation. The position of the take-up roll 4 causes the ribbons to be laminated into a rolled thread structure in the manner shown by Figs. 3 through 8. The outer wrap of vinyl chloride resin 2 is brought in contact with itself at 5 and is heat-sealed at the line of contact. The thread comprising an inner portion of rubber hydrochloride and enclosed by the heat-sealed vinyl chloride resin sheath, is passed around another rotatable heated cylinder 4 which heats the composite thread to a temperature of about 175° to 225° F., as required for the conventional stretching of the rubber hydrochloride thread. The heated thread then passes on to a suitable roll 6 which rotates at a peripheral speed of from three to ten times that of the cylinder 4. The composite thread is thereby stretched to from 200 to 1000 percent and reduced in cross-sectional area. The stretching causes a crystallization of the rubber hydrochloride, thereby increasing the tensile strength, and a firm contact of the vinyl chloride layer with the rubber hydrochloride layer throughout the dimension of the thread. The resulting thread has a higher tensile strength and greater age-resisting properties than the corresponding thread which does not have the vinyl chloride sheath. The vinyl chloride covering, which cannot be heat-sealed to rubber hydrochloride is, nevertheless, firmly engaged in contact with the rubber hydrochloride inner portion or core due to the heat-sealing of the vinyl chloride film on itself and because of the shrinking of the vinyl chloride film at the elevated temperatures employed.

Fig. 9 illustrates an alternative method of covering a rubber hydrochloride preformed thread 7 with a ribbon of vinyl chloride resin. This method is usually applicable only to large diameter threads. In accordance therewith, a rubber hydrochloride thread 7 is enclosed by winding a ribbon 8 of vinyl chloride resin from a spool 9 around the thread allowing a suitable overlapping of the ribbon on each revolution. Subsequently the covered thread is stretched to develop the characteristic crystallized structure and to increase the tensile strength, and the operation being conducted at an elevated temperature, to cause the vinyl chloride resin to heat-seal to itself where the turns overlap and to shrink and bind itself tightly around the rubber hydrochloride thread.

The preformed thread of unstretched rubber hydrochloride is made by extruding the rubber hydrochloride through a suitable die or by rolling a flat ribbon of rubber hydrochloride over a curved surface heated at a temperature sufficient to heat-seal the ribbon into a continuous tube-shaped article. A preformed thread of unstretched rubber hydrochloride may be substituted for the ribbon of rubber hydrochloride used in the process shown in Figs. 1–8 but is not preferred.

Vinyl chloride resins that may be used in accordance with this invention include plasticized polyvinyl chloride and especially the copolymers of 80 to 98 percent of vinyl chloride and from 20 to 2 percent of a comonomer of the group consisting of vinyl esters of fatty acids, such as vinyl acetate, the alkyl esters of fumaric acid, such as ethyl fumarate, methyl fumarate and butyl fumarate, and the alkyl esters of maleic acid, such as ethyl maleate, methyl maleate and hexyl maleate. The alkyl esters in which the alkyl radicals have one to six carbon atoms are preferred.

Although the invention is described with respect to specific embodiments shown in the accompanying drawings, it is not intended that the details thereof shall be construed as limitations upon the scope of the invention except to the extent incorporated in the following claims.

I claim:

1. A plastic thread comprising a continuous core and a ribbon rolled around the core and forming a sealed enclosing sheath in stretch-shrunk contact on the core, the ribbon being of vinyl chloride resin and the core being of rubber hydrochloride.

2. A plastic thread comprising at least two ribbons rolled one on the other in laminated relation, one ribbon being wider than the other and forming a sealed enclosing sheath in stretch-shrunk firm contact on the other ribbon, the one ribbon being of a vinyl chloride resin and the other ribbon being of rubber hydrochloride.

3. A plastic thread comprising a pair of ribbons rolled one on the other in laminated relation, one ribbon being wider than the other and forming a sealed enclosing sheath in stretch-shrunk firm contact on the other ribbon, the one ribbon being of a vinyl chloride resin and the other ribbon being of stretched rubber hydrochloride.

4. A plastic thread comprising a pair of ribbons rolled one on the other in laminated relation, one ribbon being wider than the other and forming a sealed enclosing sheath in stretch-shrunk firm contact on the other ribbon, the one ribbon being of a copolymer of 80 to 98% of vinyl chloride and from 20 to 2% of a monomer of the group consisting of vinyl esters of fatty acids, alkyl fumarates and alkyl maleates and the other ribbon being of stretched rubber hydrochloride.

5. A plastic thread comprising a pair of ribbons rolled one on the other in laminated relation, one ribbon being wider than the other and forming a sealed enclosing sheath in stretch-shrunk firm contact on the other ribbon, the one ribbon being of a copolymer of 80 to 98% of vinyl chloride and from 20 to 2% of vinyl acetate and the other ribbon being of stretched rubber hydrochloride.

6. A plastic thread comprising a pair of ribbons rolled one on the other in laminated relation, one ribbon being wider than the other and forming a sealed enclosing sheath in stretch-shrunk firm contact on the other ribbon, the one ribbon being of a copolymer of 80 to 98% of vinyl chloride and from 20 to 2% of ethyl fumarate and the other ribbon being of stretched rubber hydrochloride.

7. A plastic thread comprising a pair of ribbons rolled one on the other in laminated relation, one ribbon being wider than the other and forming a sealed enclosing sheath in stretch-shrunk firm contact on the other ribbon, the one ribbon being of a copolymer of 80 to 98% of vinyl chloride and from 20 to 2% of ethyl maleate and the other ribbon being of stretched rubber hydrochloride.

8. A method of preparing a plastic thread which comprises rolling at least two ribbons one on the other into laminated relation, one ribbon being wider than the other and being rolled into an enclosing sheath on the other ribbon while heating to a temperature sufficient to heat-seal the wider ribbon upon itself, the wider ribbon being of a vinyl chloride resin and the other ribbon being of rubber hydrochloride and then stretching the formed thread from 200 to 1000% of its original length.

9. A method of preparing a plastic thread which comprises rolling two ribbons one on the other into laminated relation, one ribbon being wider than the other and being rolled into an enclosing sheath on the other ribbon while heating to a temperature sufficient to heat-seal the wider ribbon upon itself, the wider ribbon being of a vinyl chloride resin and the other ribbon being of rubber hydrochloride and then stretching the formed thread from 200 to 1000% of its original length.

JOSEPH F. STALTER.

REFERENCES CITED

The following references are of record in the file of this patent:

UNITED STATES PATENTS

| Number | Name | Date |
|---|---|---|
| 2,054,354 | Alderfer | Sept. 15, 1936 |
| 2,234,523 | Fischer et al. | Mar. 11, 1941 |
| 2,335,191 | Minich | Nov. 23, 1943 |